United States Patent
Cho et al.

(10) Patent No.: US 9,771,060 B2
(45) Date of Patent: Sep. 26, 2017

(54) CONTROL METHOD AND SYSTEM FOR HYBRID VEHICLE

(71) Applicant: Hyundai Motor Company, Seoul (KR)

(72) Inventors: Jin Kuk Cho, Gyeonggi-do (KR); Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 63 days.

(21) Appl. No.: 14/843,036

(22) Filed: Sep. 2, 2015

(65) Prior Publication Data

US 2016/0129900 A1 May 12, 2016

(30) Foreign Application Priority Data

Nov. 7, 2014 (KR) .................. 10-2014-0154698

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/10* | (2016.01) |
| *B60W 10/06* | (2006.01) |

(Continued)

(52) U.S. Cl.
CPC ............ *B60W 20/10* (2013.01); *B60K 6/365* (2013.01); *B60K 6/445* (2013.01); *B60W 10/06* (2013.01); *B60W 10/08* (2013.01); *B60W 20/20* (2013.01); *B60W 20/40* (2013.01); *B60W 30/18109* (2013.01); *B60K 2006/381* (2013.01); *B60W 2540/10* (2013.01); *B60W 2540/12* (2013.01); *B60W 2710/0666* (2013.01); *B60W 2710/083* (2013.01); *Y02T 10/6239* (2013.01); *Y02T 10/6286* (2013.01); *Y10S 903/93* (2013.01)

(58) Field of Classification Search
CPC ............ B60W 20/10; B60W 2540/12; B60W 2710/0666; B60W 2710/083; B60W 20/20; B60W 20/40; B60W 30/18109; B60W 10/08; B60W 10/06; B60W 2540/10; B60K 6/365; B60K 6/445; B60K 2006/381; Y02T 10/6239; Y02T 10/6286; Y10S 903/93
USPC .................................................. 701/1, 22
See application file for complete search history.

(56) References Cited

U.S. PATENT DOCUMENTS

| | | | |
|---|---|---|---|
| 6,886,648 B1 * | 5/2005 | Hata ............ | B60K 6/387 180/65.235 |
| 8,663,061 B2 | 3/2014 | Yun | |

(Continued)

FOREIGN PATENT DOCUMENTS

| | | | | |
|---|---|---|---|---|
| JP | 2006-044348 A | 2/2006 | | |
| JP | EP 2789515 A1 * | 10/2014 | ............ | B60K 6/445 |

(Continued)

*Primary Examiner* — Jaime Figueroa
(74) *Attorney, Agent, or Firm* — Mintz Levin Cohn Ferris Glovsky and Popeo, P.C.; Peter F. Corless

(57) ABSTRACT

A control method and system for a hybrid vehicle including an engine, a first motor/generator and a second motor/generator a power sources are provided. The control method includes performing a parallel driving mode by driving with a driving power transmitted from the engine and the second motor/generator at a fixed gear ratio. Additionally, an OD brake is released from fixing a gear ratio of a planetary gear set disposed between the generator and the engine. Then an EV driving mode is performed with a driving power of the second motor/generator.

12 Claims, 8 Drawing Sheets

(51) Int. Cl.
  *B60W 10/08* (2006.01)
  *B60K 6/365* (2007.10)
  *B60K 6/445* (2007.10)
  *B60W 30/18* (2012.01)
  *B60W 20/40* (2016.01)
  *B60W 20/20* (2016.01)
  *B60K 6/38* (2007.10)

(56) References Cited

U.S. PATENT DOCUMENTS

| | | | | |
|---|---|---|---|---|
| 8,721,482 B2* | 5/2014 | Takami | ............ | B60K 6/365 475/282 |
| 2004/0058769 A1* | 3/2004 | Larkin | ............ | B60K 6/44 475/5 |
| 2005/0205314 A1* | 9/2005 | Imazu | ............ | B60W 30/182 180/65.235 |
| 2006/0022469 A1* | 2/2006 | Syed | ............ | B60K 6/44 290/40 C |
| 2006/0289212 A1* | 12/2006 | Haruhisa | ............ | B60K 6/445 180/65.235 |
| 2008/0207374 A1* | 8/2008 | Iwanaka | ............ | B60K 6/40 475/5 |
| 2010/0101880 A1* | 4/2010 | Suzuki | ............ | B60K 6/445 180/65.265 |
| 2011/0319224 A1* | 12/2011 | Takami | ............ | B60K 6/445 477/3 |
| 2012/0142490 A1 | 6/2012 | Yun | | |
| 2014/0277891 A1* | 9/2014 | Hoshiba | ............ | B60K 6/445 701/22 |
| 2015/0099605 A1* | 4/2015 | Choi | ............ | B60K 6/365 477/5 |
| 2015/0183422 A1* | 7/2015 | Imamura | ............ | B60K 6/445 477/3 |

FOREIGN PATENT DOCUMENTS

| | | |
|---|---|---|
| KR | 2007-0029096 A | 3/2007 |
| KR | 10-2012-0062360 A | 6/2012 |
| KR | 10-2014-0048678 A | 4/2014 |
| KR | 2014-0044675 A | 4/2014 |
| KR | 2014-0048582 A | 4/2014 |
| KR | 2014-0048585 A | 4/2014 |
| KR | 10-1416422 B1 | 7/2014 |

* cited by examiner

CONTROL METHOD AND SYSTEM FOR HYBRID VEHICLE

CROSS-REFERENCE TO RELATED APPLICATION

This application is based on and claims the benefit of priority to Korean Patent Application No. 10-2014-0154698, filed on Nov. 7, 2014 in the Korean Intellectual Property Office, the disclosure of which is incorporated herein in its entirety by reference.

TECHNICAL FIELD

The present disclosure relates to a control method and system for a hybrid vehicle and a power transmission device for a hybrid vehicle, and more particularly, to a control method and system for a hybrid vehicle that prevents a shifting shock from occurring when changing driving modes.

BACKGROUND

Generally, eco-friendly vehicle technology is developing, and vehicle manufacturers are accordingly developing eco-friendly vehicles to achieve environmental and fuel efficiency. Accordingly, the vehicle manufacturers have developed electric vehicles (EV), hybrid electric vehicles (HEV), fuel cell electric vehicles (FCEV) and as future vehicle technologies.

Since these types of environmentally friendly vehicles have a number of technical constraints such as weight and cost, etc., vehicle manufacturers have focused on a hybrid vehicle as a solution to the practical concerns such as emission regulation and the need to improve fuel efficiency. The hybrid vehicle has two or more power sources that may be combined in different ways. The power sources may be conventional gasoline engine or diesel engine using fossil fuel, combined with electrically-driven motor/generator.

The hybrid vehicle uses motor/generator with improved low-torque characteristic at lower speed as a main power source, and uses engine with improved high-speed torque characteristic at higher speed as a main power source. Accordingly, hybrid vehicle has an excellent effect of enhancing the fuel efficiency and reducing exhaust emissions since the engine using fossil fuel is stopped and motor/generator is used in the lower speed range.

A power transmission device for the hybrid vehicle described above is classified into a single-mode type and a multi-mode type. The single-mode type has an advantage of not requiring a torque transmission device such as a clutch and a brake for speed change control, but it also has the drawbacks such as low fuel efficiency due to deteriorating efficiency at high speed driving and need for additional torque pump-up device for applications in large vehicles. The multi-mode type has advantages such as high efficiency at high speed driving, and applicability for various vehicle sizes since it can be designed to pump up torque autonomously.

Therefore, in recent years, the multi-mode type has been mainly adopted, rather than single-mode type. The multi-mode type power transmission device includes a plurality of planetary gear sets, a plurality of motor/generators used for imparting motion and generating electricity, a plurality of torque transmission devices (friction elements) to control the rotation elements of the planetary gear sets, and battery used as an energy source for the motor/generator.

The multi-mode type power transmission device has different working mechanisms based on the connection configuration of the planetary gear sets, the motor/generator, and the torque transmission device. The conventional hybrid vehicle implements motor torque control methods to prevent the shifting shock or to reduce shifting shock generated during mode change.

However, the motor torque control has the following drawbacks. First, torque control using a motor (MG1) may have increased current consumption to apply torque at 0 rpm, which in turn may cause problems such as overheating and deteriorating durability of the battery, inverter or motor. Second, releasing the OD brake during regenerative braking may cause the energy generated from MG2 to be discharged to MG1, which may degrade system efficiency. Lastly, the torque control of the MG1 (motor) may have degraded drivability and riding comfort since it is not possible to perform control when the SOC is depleted.

SUMMARY

The present disclosure improves system efficiency by reducing the fuel consumption of an engine. In addition, the present disclosure improves system efficiency by reducing excessive current consumption of a motor. The objects mentioned above, and other objects not described herein will be clearly understood to a person skilled in the relevant art from the following description.

According to an exemplary embodiment of the present disclosure, a control method for a hybrid vehicle including an engine, a first motor/generator, and a second motor/generator as a power source, may include: driving with a driving power transmitted from the engine and the second motor/generator at a fixed gear ratio for a parallel driving mode, releasing an OD brake from fixing a gear ratio of a planetary gear set disposed between the generator and the engine, and driving with a driving power of the second motor/generator in an EV mode.

According to another exemplary embodiment of the present disclosure, a control method for a hybrid vehicle including an engine, a first motor/generator, and a second motor/generator as a power source, may include: driving with a driving power transmitted from the engine and the second motor/generator at a fixed gear ratio for a parallel driving mode, releasing an OD brake from fixing a gear ratio of a planetary gear set disposed between the generator and the engine, and driving in a power split mode after the OD brake release step. Specific details of other exemplary embodiments are included in the following description and drawings.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
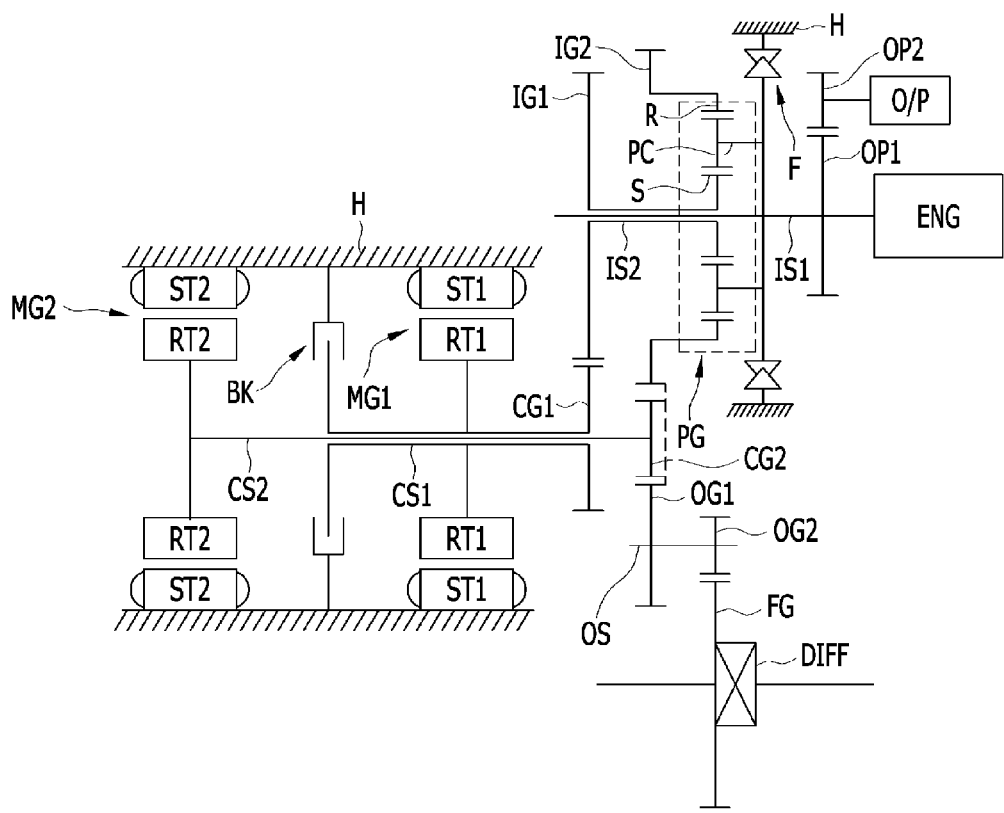
FIG. 1 is a schematic diagram of a power transmission device for a hybrid vehicle according to a first exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present disclosure will be described in detail with reference to the accompanying drawings. However, the present disclosure is not limited to the exemplary embodiments set forth herein, and may be implemented in many different forms, and these embodiments are merely provided to complete the disclosure of the present disclosure, and to inform a person skilled in the art exactly the scope of the present disclosure, and the present disclosure will only be defined by the appended claims. The same reference numerals or symbols throughout the specification refer to the same elements.

Hereinafter, with reference to the drawings provided to explain a hybrid vehicle and a control method, the present disclosure will be explained based on the exemplary embodiments of the present disclosure. Referring to FIG. 1, a reference symbol O/P, denotes an oil pump, configured to generate a hydraulic pressure necessary for the transmission, by receiving a rotational power of a first input shaft (IS1) through external gear engagement between an oil pump drive gear (OP1) disposed on the first input shaft IS1 and an oil pump driven gear (OP2).

Figure 2:
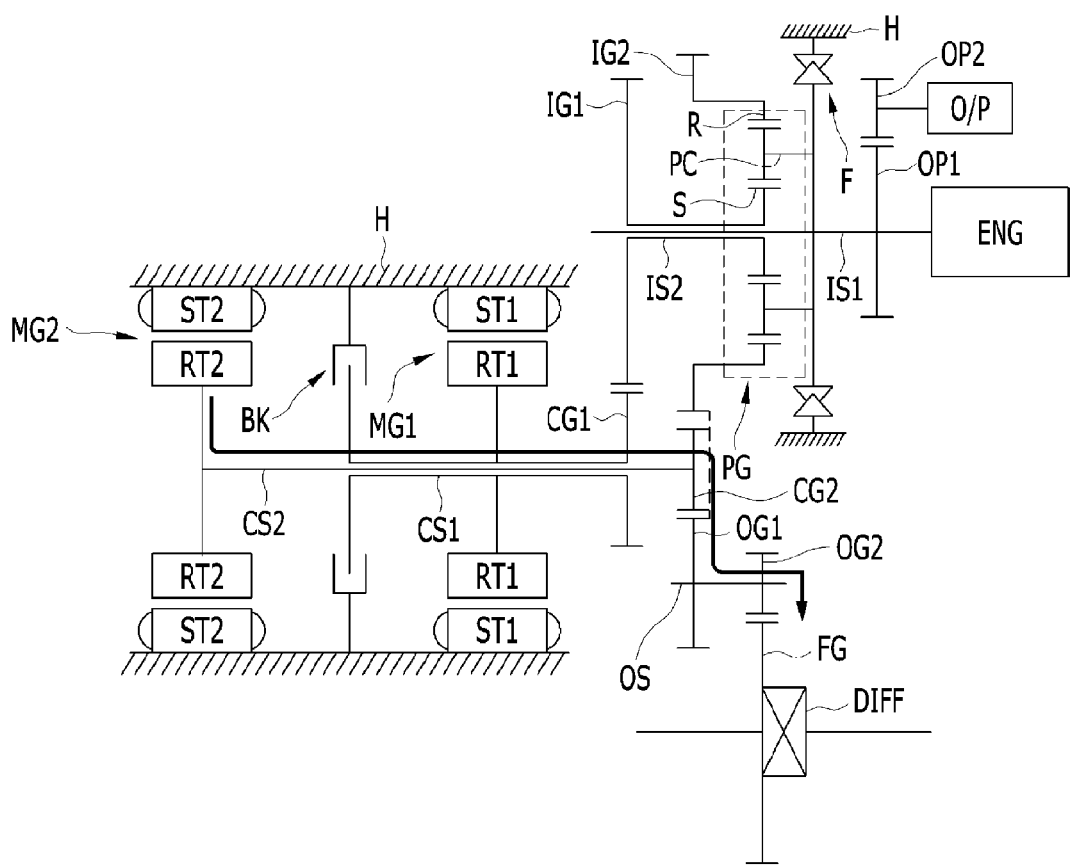
FIG. 2 is a power transmission schematic diagram of a power transmission device for a hybrid vehicle in EV mode, according to the first exemplary embodiment of the present disclosure.

FIG. 2 is a power transmission schematic diagram of a hybrid vehicle power transmission device in EV mode according to a first exemplary embodiment of the present disclosure. Referring to FIG. 2, when the engine (ENG) stopped in the EV mode, the driving power of the second motor/generator (MG2) may be transmitted to a differential (DIFF) final reduction gear (FG) via a second counter shaft 2 (CS2), a second counter gear (CG2), a first output gear (OG1), an output shaft (OS), and a second output gear (OG2). In other words, by adjusting the output of the second motor/generator (MG2), electrical stepless speed change and driving of the vehicle may be performed.

Figure 3:
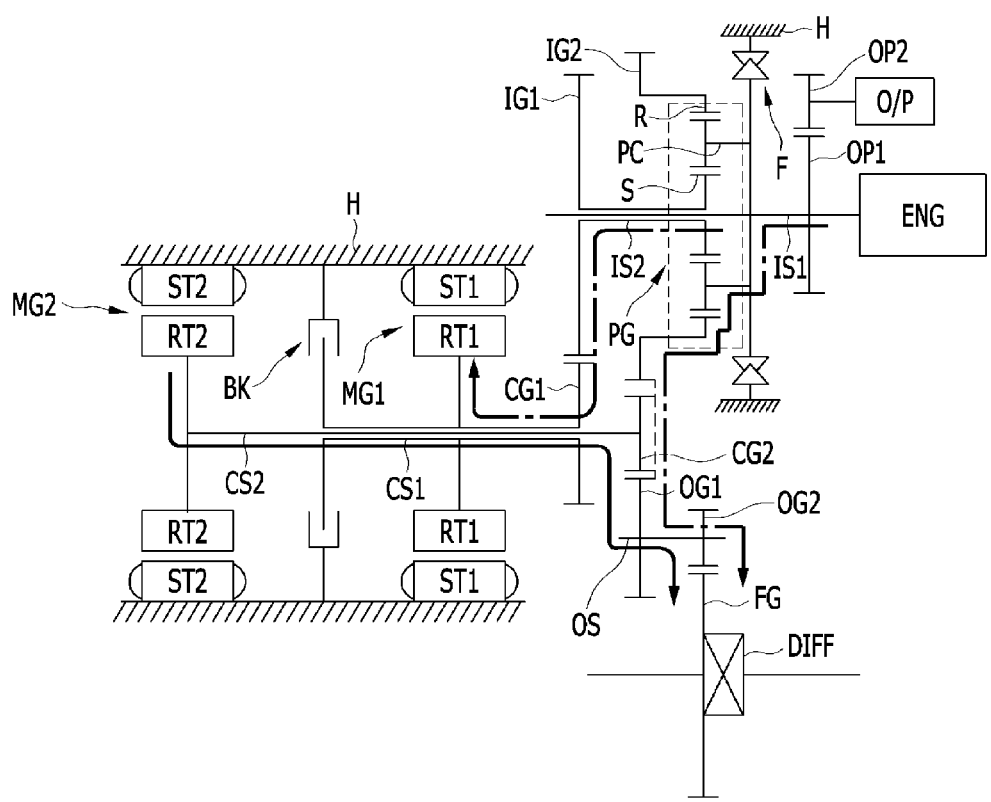
FIG. 3 is a power transmission schematic diagram of a power transmission device for a hybrid vehicle in power split mode, according to the first exemplary embodiment of the present disclosure.

FIG. 3 is a power transmission schematic diagram of a hybrid vehicle power transmission device in power split mode according to the first exemplary embodiment of the present disclosure. Referring to FIG. 3, in power split mode, the rotational power of the engine (ENG) may be transmitted as a driving power of the drive wheel and as a driving power for generation of the first motor/generator (MG1), and the rotational power of the second motor/generator (MG2) may be applied as auxiliary power.

In other words, the engine (ENG) may be started by the first motor/generator (MG1), and the rotational power of the engine (ENG) may be branched at the planetary gear set (PG), to reduce the speed of a portion of the rotational power and to transmit the power to the differential final reduction gear (FG) and to the drive wheel using the second input gear (IG2), the first output gear (OG1), the output shaft (OS), and the second output gear (OS2), and the remaining rotational power may be input to the first motor/generator (MG1) and then transmitted as the driving power for regeneration through the second input gear (IG2), the first counter gear (CG1), and the first counter shaft (CS1).

The electric power generated from the first motor/generator (MG1) may be used as electric energy to drive the second motor/generator (MG2) or may be charged to battery (not shown). In addition, the rotational power of the second motor/generator (MG2) used as the auxiliary power may be reduced again in speed and transmitted to the differential (DIFF) final reduction gear (FG) and to the drive wheel using the second counter shaft (CS2), the second counter gear (CG2), the first output gear (OG1), the output shaft (OS), and the second output gear (OG2).

Figure 4:
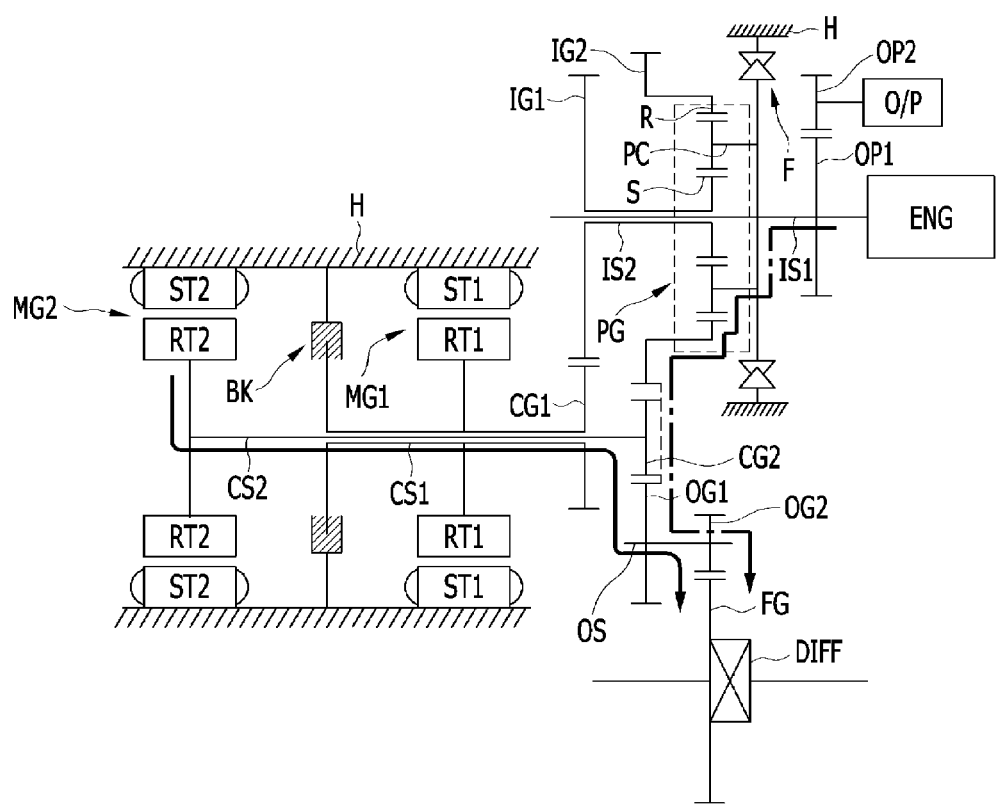
FIG. 4 is a power transmission schematic diagram of a power transmission device for a hybrid vehicle in direct-drive (OD) mode according to the first exemplary embodiment of the present disclosure.

FIG. 4 is a power transmission schematic diagram of the hybrid vehicle power transmission device in direct-drive (OD) mode according to the first exemplary embodiment of the present disclosure. Referring to FIG. 4, in the direct-drive (OD) mode, an OD brake (BK) may be operated to operate the sun-gear (S) of the planetary gear set (PG) as a fixed factor.

The rotational power of the engine (ENG) may be increased in speed at the planetary gear set (PG) and may be reduced in speed and transmitted to the differential (DIFF) final reduction gear (FG) and transmitted to the drive wheel through the second input gear (IG2), the first output gear (OG1), the output shaft (OS), and the second output gear (OG2). In addition, the rotational power of the second motor/generator (MG2) used as the auxiliary power may be reduced in speed and transmitted to the differential (DIFF) final reduction gear (FG) and transmitted to the drive wheel through the second counter shaft (CS2), the second counter gear (CG2), the first output gear (OG1), the output shaft (OS) and the second output gear (OG2).

Figure 5:
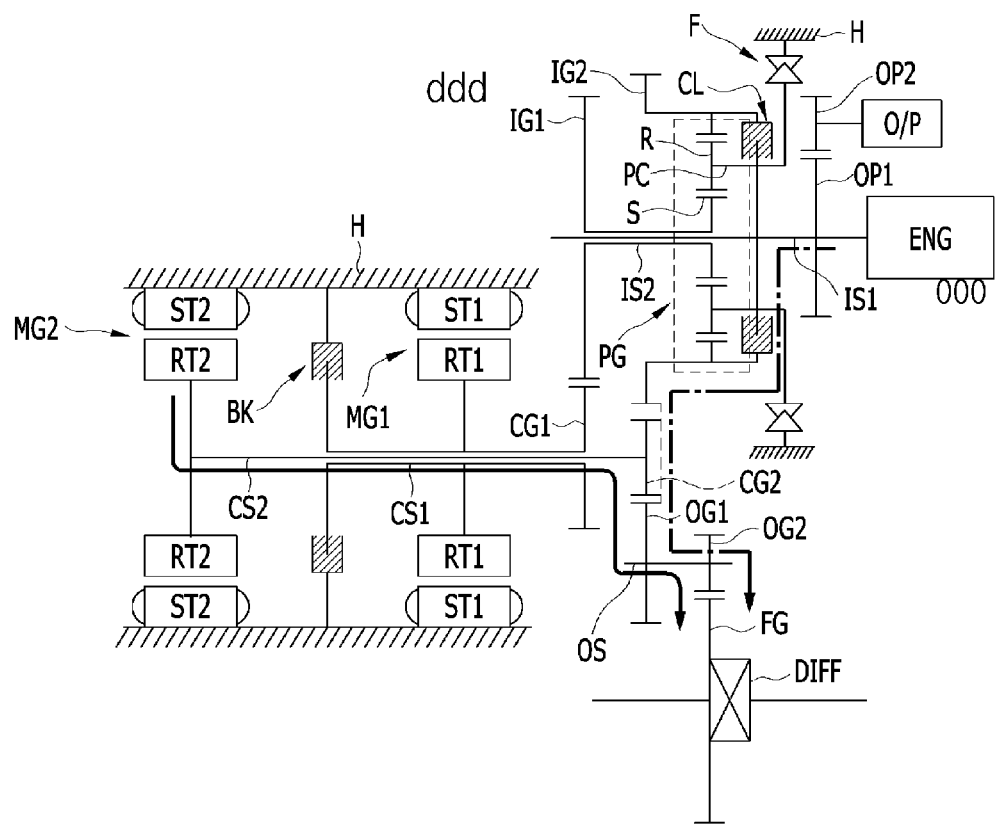
FIG. 5 is a power transmission schematic diagram of a power transmission device for a hybrid vehicle in direct-drive (1:1) mode according to a second exemplary embodiment of the present disclosure.

FIG. 5 is a power transmission schematic diagram of the hybrid vehicle power transmission device in direct-drive (1:1) mode according to the second exemplary embodiment of the present disclosure. Referring to FIG. 5, in the second exemplary embodiment, a clutch (CL) for variable direct drive is disposed on the planetary gear set (PG). In other words, among three rotational elements of the planetary gear set (PG), two rotational elements may be variably connected, thus having the planetary gear set (PG) in a direct drive state, to thus output the rotational power input from the engine (ENG).

Accordingly, rotational power of the engine (ENG) may be output through the planetary gear set (PG), and may be reduced in speed and transmitted to the drive wheel, through the second input gear (IG2), the first output gear (OG1), the output shaft (OS), the second output gear (OG2), and the differential (DIFF) final reduction gear (FC). In addition, the rotational power of the second motor/generator (MG2) used as the auxiliary power may be reduced in speed and transmitted to the differential (DIFF) final reduction gear (FG) to the drive wheel using the second counter shaft (CS2), the second counter gear (CG2), the first output gear (OG1), the output shaft (OS), and the second output gear (OG2).

Figure 6:
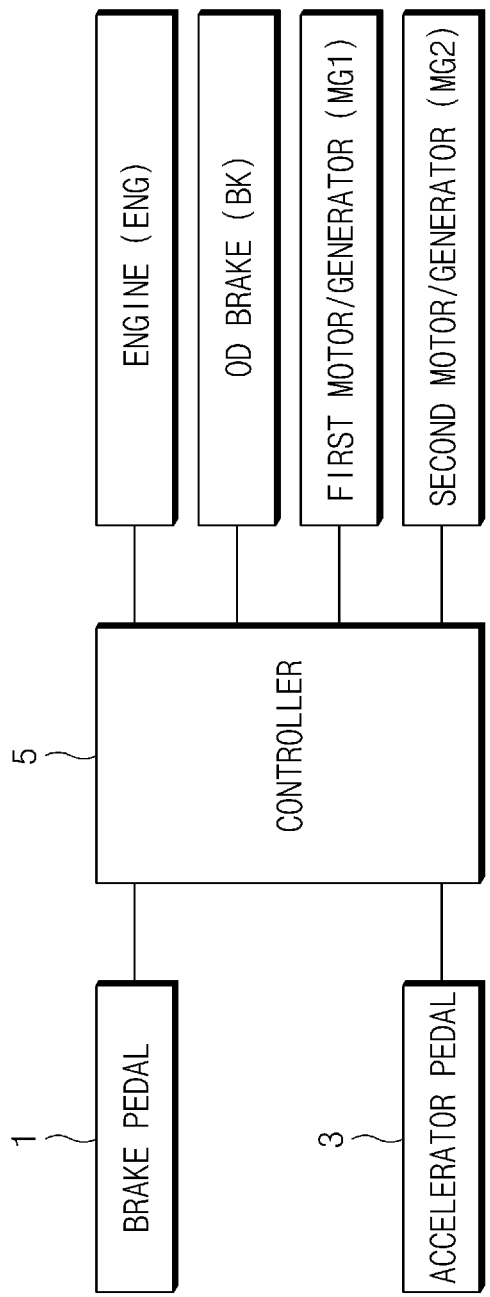
FIG. 6 is a block diagram of a hybrid vehicle according to an exemplary embodiment of the present disclosure.
Figure 7:
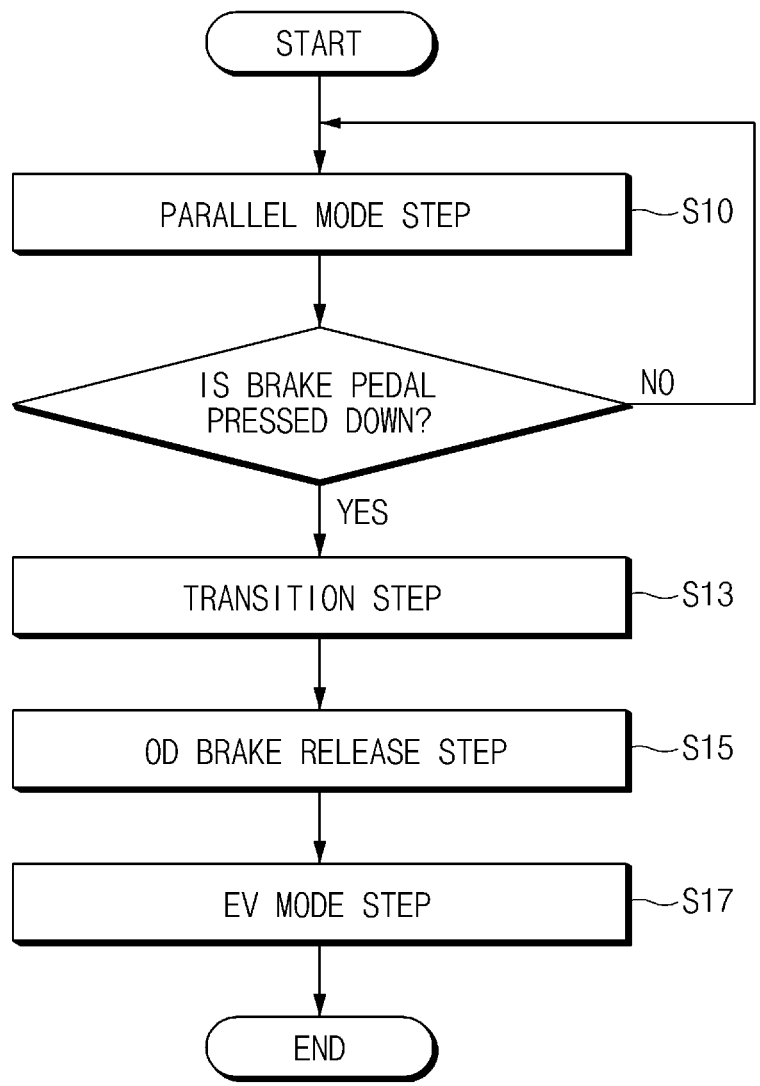
FIG. 7 is a flow chart of a control method for a hybrid vehicle according to an exemplary embodiment of the present disclosure.
Figure 8:
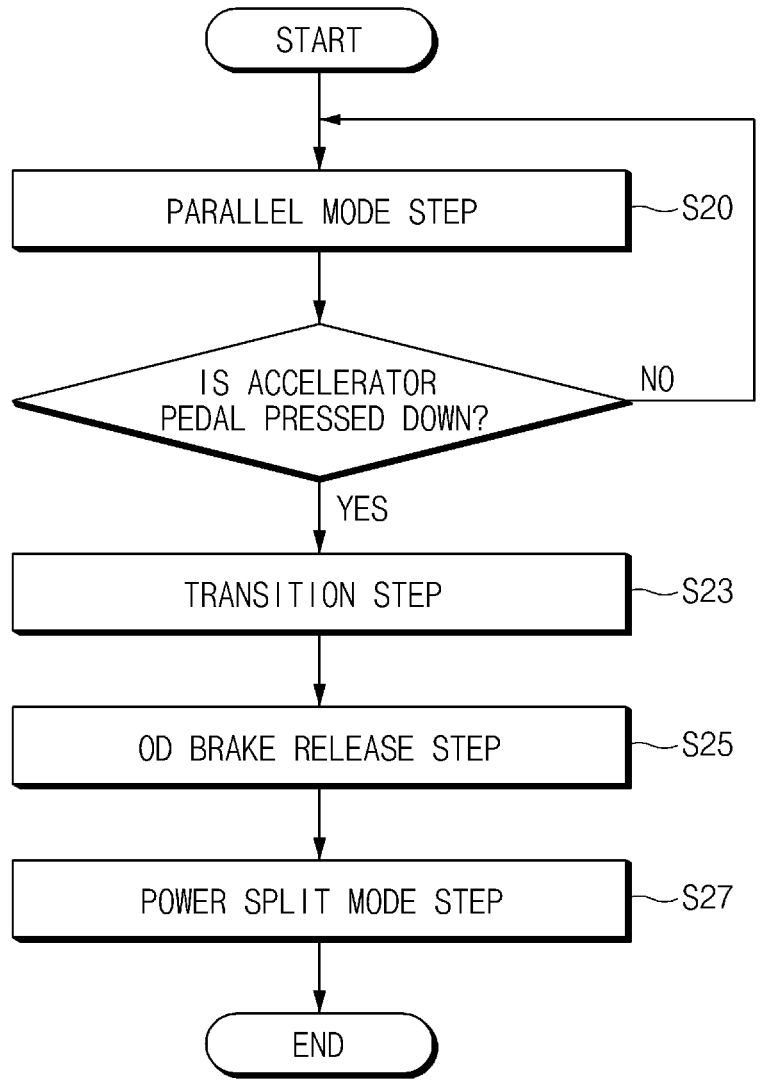
FIG. 8 is a flow chart of a control method for a hybrid vehicle according to the exemplary embodiment of the present disclosure.

FIG. 6 is a block diagram of the hybrid vehicle according to an exemplary embodiment of the present disclosure. FIG. 7 is a flow chart illustrating a control method for the hybrid vehicle according to an exemplary embodiment of the present disclosure. FIG. 8 is a flow chart of a control method for the hybrid vehicle according to an exemplary embodiment of the present disclosure.

Referring to FIGS. 6 to 8, a control method for a hybrid vehicle according to an exemplary embodiment of the present disclosure is illustrated, in which the hybrid vehicle may include the engine (ENG), the first motor/generator (MG1), and the second motor/generator (MG2) as power sources. The various components of the vehicle may be operated by a controller.

In particular, the control method may include a parallel driving mode (S10) in which the power is received from the engine (ENG) and the second motor/generator (MG2) at a fixed gear ratio, releasing the OD brake from fixing the gear ratio of planetary gear set disposed between generator and engine (ENG) (S15); and driving in an EV mode (S17) using driving power of the second motor/generator (MG2).

According to an exemplary embodiment of the present disclosure, the control method for a hybrid vehicle may further include decreasing the planetary gear set speed (S13) after the parallel mode step (S10) and before the OD brake (BK) release step (S15). The decreasing of the planetary gear set speed (S13) includes adjusting the torque of the first motor/generator (MG1) which generates electricity with the driving power received from the engine (ENG) and the torque of the engine (ENG) to be 0.

In addition, the decreasing speed process (S13) includes increasing the torque of the second motor/generator (MG2). The decreasing speed process may be performed when a brake pedal 1 is engaged (e.g., pressure is applied to the pedal). Additionally, the decreasing speed process (S13) may be performed to transition the parallel mode into the electric vehicle (EV) mode. When the brake pedal 1 is engaged, the controller 5 may be configured to determine a need for the transition from the parallel mode into the EV mode. Then, the controller 5 may be configured to decreasing the speed of the planetary gear set. In addition, before OD brake is released, the controller 5 may be configured to adjust the torque of the engine (ENG) and the torque of the first motor/generator (MG1) to become 0. In other words, the engine (ENG) should overcome the friction torque and the output torque of the flywheel may be 0.

Meanwhile, the second motor/generator (MG2) may be used to compensate for the reduced engine (ENG) torque to thus provide the torque as desired by the driver. Since the transition from the parallel mode to EV mode generally corresponds to the state of the regeneration brake, the controller 5 may be configured to operate the second motor/generator (MG2) to manage the torque as required. The controller 5 may also be configured to release the OD brake (BK) release when the engine (ENG) torque is output as 0. Accordingly, since the engine (ENG) torque is 0, the rotational speed of the carrier and the sun-gear may not diverge.

After completion of the OB brake (BK) release, the controller 5 may be configured to operate the engine (ENG) to perform fuel cut control. Although the rotational speed of the engine (ENG) may be decreased to 0 rpm due to fuel cut, absence of the engine (ENG) stop control may cause damage to the OWC due to engine's inertia. Therefore, the controller 5 may be configured to perform speed adjustment (e.g., control) to stop the engine (ENG) using the first motor/generator (MG1) when the engine (ENG) is at rotational speed below a predetermined rpm (e.g., proximity to 0 rpm).

The control method for a hybrid vehicle according to an exemplary embodiment of the present disclosure, in which the hybrid vehicle includes the engine (ENG), the first motor/generator (MG1) and the second motor/generator (MG2) as power sources may include performing a parallel driving mode (S20) by driving with the power transmitted from the engine (ENG) and the second motor/generator (MG2) at a fixed gear ratio, releasing the OD brake (BK) (S25) from fixing the gear ratio of planetary gear set disposed between the generator and the engine (ENG); and performing power split driving mode (S27) after the OD brake (BK) release step (S25).

According to an exemplary embodiment of the present disclosure, the control method for a hybrid vehicle may further include decreasing the speed of the planetary gear set (S23) after the parallel driving mode (S20) and before the OD brake (BK) release (S25). In the decrease of speed process (S23), the torque of the first motor/generator (MG1) which receives the driving power from the engine (ENG) to generate electricity, and the torque of the engine (ENG) may be adjusted to become about 0. The decrease of speed process (S23) may further include vehicle speed tracking in which the torque of the second motor/generator (MG2) may be increased.

In addition, the decreasing of the speed (S23) may be performed when an accelerator pedal is engaged (e.g., pressure is applied to the pedal). The decrease of speed (S23) may also be performed to transition from the parallel mode into the power split mode. When the accelerator pedal 3 is engaged, the controller 5 may be configured to determine a need for transition from the parallel mode to the power split mode. Then, the controller 5 may be configured to decrease the speed of the planetary gear set. In addition, before OD brake is released, the controller 5 may be configured to adjust the torque of the engine (ENG) and the torque of the first motor/generator (MG1) to become 0. In other words, the engine (ENG) should overcome the friction torque to allow the output torque of the flywheel to become 0.

Meanwhile, the second motor/generator (MG2) may be used to compensate for the decreased engine (ENG) torque to provide the torque as desired by the driver. The controller 5 may also be configured to release the OD brake (BK) release when the engine (ENG) torque is output as 0. Since engine (ENG) torque is 0, the rotational speed of the carrier and sun-gear may not diverge. After completion of the brake release, the controller 5 may be configured to adjust the speed to a target rotational speed to drive at a target engine (ENG) operating point in the power split mode, using the first motor/generator (MG1) or the first motor/generator (MG1) and the engine (ENG).

Meanwhile, the transition from the parallel mode to the power split mode may be accompanied with the second motor/generator (MG2) being unable to provide the driver with desired torque due to system limit. In particular, the controller 5 may be configured to execute the transition to the power split mode. In response to determining a need to limit the second motor/generator (MG2) torque due to system limit, before the OD brake (BK) is released, the controller 5 may be configured to operate the second motor/generator (MG2) to output up to system limit torque.

In addition, the controller 5 may be configured to operate the engine (ENG) to provide the torque as desired by the driver. Particularly, the engine (ENG) and the second motor/generator (MG2) vary to the target torque at a predetermined slope. The first motor/generator (MG1) may be configured to output reactive torque relative to the engine (ENG) torque before the OD brake (BK) is released. After the OD brake (BK) is released, the controller 5 may be configured to adjust the speed of engine (ENG) to the target speed, by operating the first motor/generator (MG1) or the first motor/generator (MG1), and the engine (ENG).

As described above, according to exemplary embodiments of the present disclosure, following effects are provided. First, since torque control may be performed using an engine, fuel consumption of the engine may be reduced and the system efficiency may be improved. Second, since torque control may be performed using the engine, excessive current consumption of the motor may be reduced, and the system efficiency may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A control method for a hybrid vehicle including an engine, a first motor/generator and a second motor/generator as power sources, the control method comprising:
   performing, by a controller, a parallel driving mode by driving with a driving power transmitted from the engine and the second motor/generator at a fixed gear ratio;
   releasing, by the controller, an OD brake from fixing a gear ratio of a planetary gear set disposed between the generator and the engine;
   performing, by the controller, an electric vehicle (EV) driving with the driving power of the second motor/generator; and
   reducing, by the controller, speed of the planetary gear set after the parallel driving mode and before the OD brake release.

2. The control method according to claim 1, wherein in the speed reduction process, torque of the first motor/generator which generates electricity with the driving power transmitted from the engine, and torque of the engine are adjusted to become 0.

3. The control method according to claim 2, wherein the speed reduction further includes:
   increasing, by the controller, torque of the second motor/generator.

4. The control method according to claim 1, wherein the speed reduction is performed when a brake pedal is engaged.

5. A control method for a hybrid vehicle including an engine, a first motor/generator and a second motor/generator as a power source, the control method comprising:
   performing, by a controller, a parallel driving mode by driving with a driving power transmitted from the engine and the second motor/generator at a fixed gear ratio;
   releasing, by the controller, an OD brake from fixing a gear ratio of a planetary gear set disposed between the generator and the engine;
   performing, by the controller, a power split driving mode after the OD brake is released; and
   reducing, by the controller, a speed of the planetary gear set after the parallel driving mode and before the OD brake released.

6. The control method according to claim 1, wherein in the speed reduction, torque of the first motor/generator which generates electricity with the driving power transmitted from the engine, and torque of the engine are adjusted to become 0.

7. The control method according to claim 6, wherein the speed reduction further includes:
   increasing, by the controller, torque of the second motor/generator.

8. The control method according to claim 1, wherein the speed reducing is performed when an accelerator pedal is engaged.

9. A control system for a hybrid vehicle including an engine, a first motor/generator and a second motor/generator as power sources, the control method comprising:
   a memory configured to store program instructions; and
   a processor configured to execute the program instructions, the program instructions when executed configured to:
      perform a parallel driving mode by driving with a driving power transmitted from the engine and the second motor/generator at a fixed gear ratio;

release an OD brake from fixing a gear ratio of a planetary gear set disposed between the generator and the engine;
perform an electric vehicle (EV) driving with the driving power of the second motor/generator; and
reduce speed of the planetary gear set after the parallel driving mode and before the OD brake release.

10. The control system according to claim 9, wherein in the speed reduction process, torque of the first motor/generator which generates electricity with the driving power transmitted from the engine, and torque of the engine are adjusted to become 0.

11. The control system according to claim 10, wherein in the speed reduction the program instructions when executed are further configured to:
increase torque of the second motor/generator.

12. The control system according to claim 11, wherein the speed reduction is performed when a brake pedal is engaged.

* * * * *